US012673513B2

(12) United States Patent
Nishikawa

(10) Patent No.: US 12,673,513 B2
(45) Date of Patent: Jul. 7, 2026

(54) PRINTING DEVICE

(71) Applicant: SEIKO EPSON CORPORATION, Tokyo (JP)

(72) Inventor: Ryo Nishikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 18/418,036

(22) Filed: Jan. 19, 2024

(65) Prior Publication Data

US 2024/0246333 A1 Jul. 25, 2024

(30) Foreign Application Priority Data

Jan. 20, 2023 (JP) ................................ 2023-007152

(51) Int. Cl.

| | |
|---|---|
| ***B41J 25/00*** | (2006.01) |
| ***B41J 29/02*** | (2006.01) |
| *B41J 3/407* | (2006.01) |
| *B41J 29/19* | (2006.01) |

(52) U.S. Cl.

CPC ............ *B41J 25/001* (2013.01); *B41J 29/02* (2013.01); *B41J 3/4078* (2013.01); *B41J 29/19* (2013.01)

(58) Field of Classification Search

CPC ........ B41J 25/001; B41J 29/02; B41J 3/4078; B41J 29/19; B41J 29/13

See application file for complete search history.

(56) References Cited

FOREIGN PATENT DOCUMENTS

| | | |
|---|---|---|
| JP | 2016-196108 A | 11/2016 |
| JP | 2016-215522 A | 12/2016 |
| WO | 2018/061746 A | 4/2018 |

*Primary Examiner* — Justin Seo

(74) *Attorney, Agent, or Firm* — WORKMAN NYDEGGER

(57) ABSTRACT

A printing device includes a support portion having a support surface supporting a medium, a head unit configured to print an image on the medium supported by the support portion, a first movement portion configured to move the head unit in a first direction; a second movement portion configured to move the first movement portion in a second direction intersecting with the first direction, and an illumination unit disposed to face the support surface and configured to emit light, and the illumination unit moves in the second direction.

5 Claims, 3 Drawing Sheets

PRINTING DEVICE

The present application is based on, and claims priority from JP Application Serial Number 2023-007152, filed Jan. 20, 2023, the disclosure of which is hereby incorporated by reference herein in its entirety.

BACKGROUND

1. Technical Field

The present disclosure relates to a printing device such as a printer.

2. Related Art

For example, there is a printer which is an example of a printing device that ejects ink which is an example of a liquid from a head onto roll paper which is an example of a medium, and performs printing, as in JP-A-2016-215522. The printer includes a housing and an illumination unit. The illumination unit is provided to extend in an X-axis direction which is an example of a first direction, and is fixed inside the housing. The illumination unit emits illumination light over an entire area in which an image is formed at the roll paper.

As in JP-A-2016-215522, in the case of a printing device that performs printing by moving the head in one direction, the illumination unit extending in one direction can illuminate an entire area in which printing is performed. However, in the case of a printing device that performs printing by moving a head in two directions, an illumination unit extending in one direction can illuminate only a part of the area in which printing is performed. Therefore, a user can only confirm a printing situation within a limited range.

SUMMARY

A printing device for solving the above problem includes: a support portion having a support surface supporting a medium; a head unit configured to print an image on the medium supported by the support portion; a first movement portion configured to move the head unit in a first direction; a second movement portion configured to move the first movement portion in a second direction intersecting with the first direction; and an illumination unit disposed to face the support surface and configured to emit light, wherein the illumination unit moves in the second direction.

DESCRIPTION OF EMBODIMENTS

Embodiment

Figure 1:
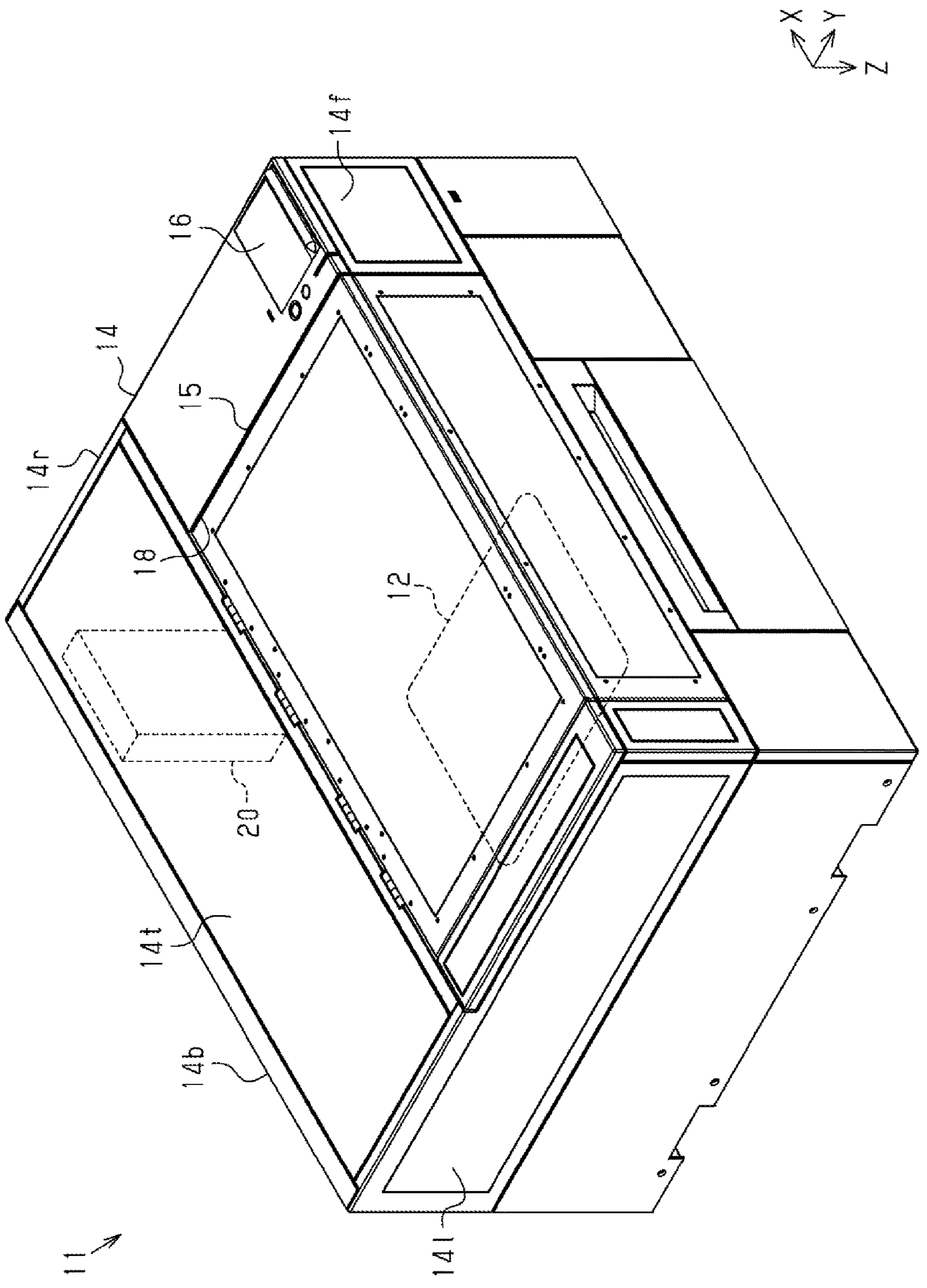
FIG. 1 is a perspective view of an embodiment of a printing device.

Hereinafter, an embodiment of a printing device will be described with reference to the drawings. The printing device is an inkjet printer that ejects ink which is an example of a liquid onto a medium such as paper, fabric, vinyl, a plastic part, or a metal part, and performs printing.

In the drawing, when it is assumed that a printing device 11 is placed on a horizontal surface, a direction of gravity is indicated by a Z-axis, and directions along the horizontal surface are indicated by an X-axis and a Y-axis. The X-axis, Y-axis, and Z-axis are orthogonal to each other. In the following description, a direction parallel to the X-axis is also called a first direction X, a direction parallel to the Y-axis is also called a second direction Y, and a direction parallel to the Z-axis is also called a third direction Z. In the following description, in a state in which the printing device 11 is viewed from the front, a front side is also referred to as a forward direction, a back side as a backward direction, a right side as a right direction, a left side as a left direction, a bottom side as a downward direction, and a top side as an upward direction. The right direction and the first direction X are the same direction. The forward direction and the second direction Y are the same direction. The downward direction and the third direction Z are the same direction. The first direction X, the second direction Y, and the third direction Z are different directions and intersect with each other.

Printing Device

As illustrated in FIG. 1, a printing device 11 performs printing on a medium 12. The printing device 11 may perform printing on the medium 12 by ejecting a liquid. The printing device 11 of the present embodiment performs printing on a flexible medium 12 such as a T-shirt.

The printing device 11 may include a housing 14, a cover 15 and an operating unit 16.

Figure 2:
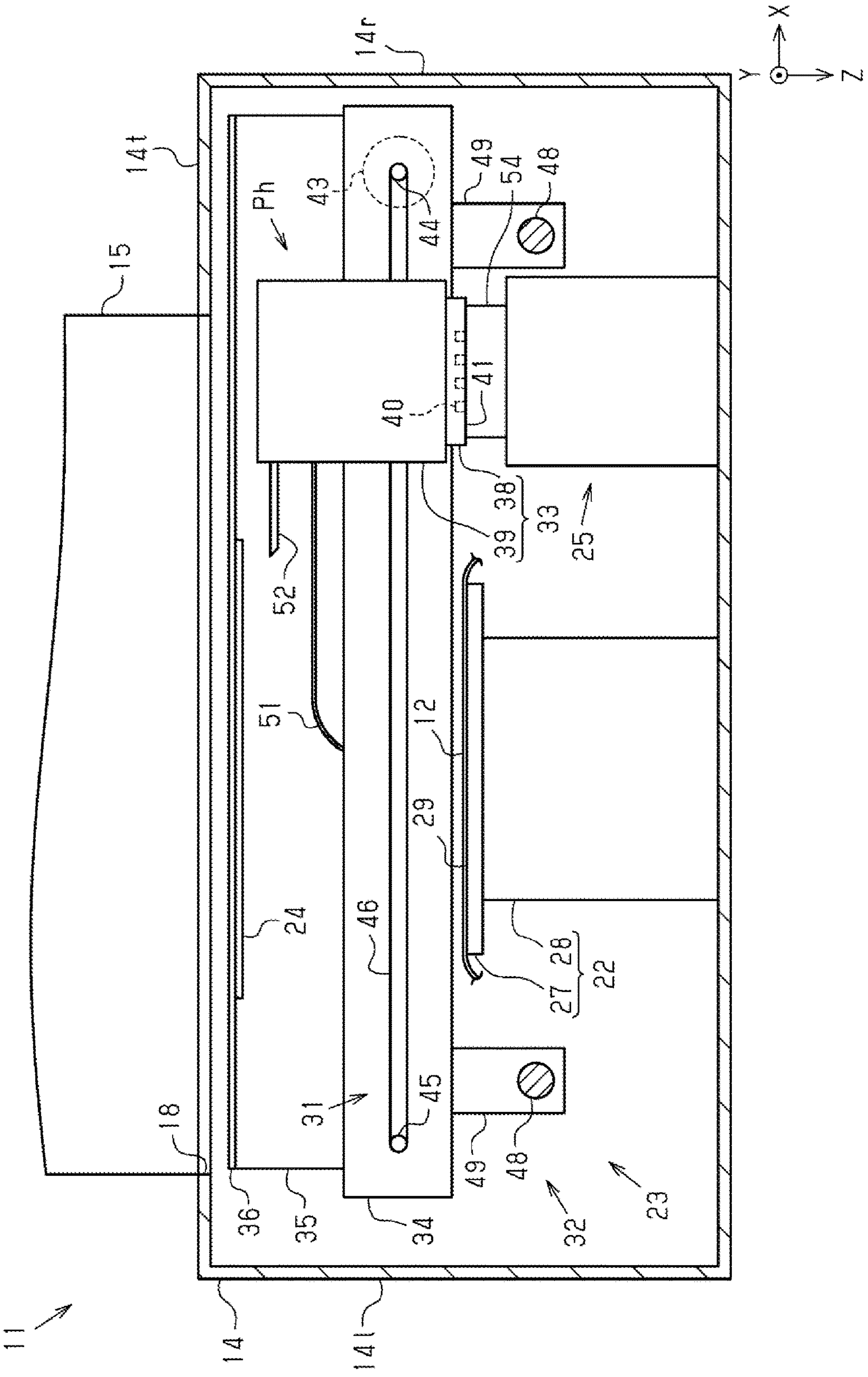
FIG. 2 is a schematic cross-sectional view of the printing device.

The cover 15 may be provided movably between a closing position illustrated in FIG. 1 and an open position illustrated in FIG. 2. The cover 15 located at the closing position closes an opening 18 provided in the housing 14. When the cover 15 moves to the open position, various members accommodated in the housing 14 are exposed through the opening 18. In the present embodiment, the movement of the cover 15 from the closing position is also called the cover 15 opening, and the movement of the cover 15 to the closing position is also called the cover 15 closing.

The operating unit 16 can be operated by a user. The operating unit 16 may have buttons, panels, switches, and the like for performing various operations of the printing device 11, or may be a touch panel capable of displaying and operating information.

The housing 14 may include a top surface 14*t*, a front surface 14*f*, a left side surface 14*l*, a right side surface 14*r*, and a back surface 14*b*. The cover 15 may form part of the top surface 14*t* and part of the front surface 14*f*.

The top surface 14*t* intersects the front surface 14*f*, the left side surface 14*l*, the right side surface 14*r*, and the back surface 14*b*. The top surface 14*t* is provided in the upward direction relative to the front surface 14*f*, the left side surface 14*l*, the right side surface 14*r*, and the back surface 14*b*. The top surface 14*t* is directed in the upward direction. The top surface 14*t* may be a surface having components in the first direction X and the second direction Y.

The front surface 14*f* and the back surface 14*b* are spaced apart in the second direction Y. The front surface 14*f* is located in the forward direction relative to the back surface 14*b* and is directed in the forward direction. The back surface 14*b* is directed backward. The front surface 14*f* and the back surface 14*b* may be surfaces having components in the first direction X and the third direction Z.

The right side surface 14*r* and the left side surface 14*l* are spaced apart in the first direction X. The right side surface 14*r* is located in the right direction relative to the left side surface 14*l* and is directed in the right direction. The left side surface 14*l* is directed in the left direction. The right side surface 14*r* and the left side surface 14*l* may be surfaces having components in the second direction Y and the third direction Z.

At least a portion of the housing 14 may be formed by a transparent member. At least one of the top surface 14*t*, the front surface 14*f*, the right side surface 14*r*, the left side surface 14*l*, and the back surface 14*b* may be partially or wholly formed by a transparent member. For example, at least the top surface 14*t* of the housing 14 may be formed by a transparent member. At least a portion of the cover 15 may be formed by a transparent member. The transparent member is a member that transmits light, and may be colorless and transparent, colored and transparent, or translucent. For example, the top surface 14*t* may have a front half formed by a transparent member and a rear half formed by a translucent member. For example, each of the front surface 14*f*, the right side surface 14*r*, and the left side surface 14*l* may have an upper half formed by a transparent member and a lower half formed by an opaque member.

Internal Configuration

As illustrated in FIG. 1, the printing device 11 includes a control unit 20. The control unit 20 controls various operations that are executed by the printing device 11.

The control unit 20 can be configured as a circuit including α: one or more processors that execute various processes according to a computer program, β: one or more dedicated hardware circuits that execute at least some of the various processes, or γ: a combination thereof. The hardware circuit is, for example, an application-specific integrated circuit. The processor includes a CPU, and a memory such as a RAM and a ROM, and the memory stores program code or instructions configured to cause the CPU to execute processes. The memory, that is, a computer-readable medium, includes any readable medium that can be accessed by a general purpose or dedicated computer.

As illustrated in FIG. 2, the printing device 11 includes a support portion 22, a printing unit 23, and an illumination unit 24. The printing device 11 may include a maintenance portion 25.

The support portion 22 may include a support base 27 and an elevation unit 28. The support base 27 includes a support surface 29. That is, the support portion 22 has a support surface 29 that supports the medium 12. The support surface 29 can support at least a print area of the medium 12 in which printing is performed.

When the cover 15 is open, the support surface 29 is exposed to the outside. The user can set the medium 12 on the support portion 22 in a state in which the cover 15 is open. The user can collect the printed medium 12 from the support portion 22 by opening the cover 15.

The support surface 29 of the present embodiment is a surface perpendicular to the third direction Z and parallel to the first direction X and the second direction Y. That is, the third direction Z is a direction intersecting with the support surface 29. The support surface 29 is directed in the top direction. The support surface 29 provides flat support for the media 12 placed thereon.

The elevation unit 28 elevates the support base 27. The elevation unit 28 may reciprocate the support base 27 along the Z-axis. The elevation unit 28 of the present embodiment does not move the support base 27 in a direction parallel to the support surface 29. The elevation unit 28 can adjust a position of the support surface 29 in the third direction Z.

The printing unit 23 includes a first movement portion 31, a second movement portion 32, and a head unit 33. The printing unit 23 may include a guide frame 34, an accommodation frame 35, and a top plate 36. The printing unit 23 performs printing on the medium 12 supported by the support surface 29. The printing unit 23 can move in the second direction Y in a state in which the support portion 22 is straddled in the first direction X. The printing unit 23 is configured in a gate shape when viewed from the front.

The housing 14 is configured to accommodate various members included in the printing device 11. For example, the housing 14 accommodates the support portion 22, the head unit 33, the first movement portion 31, the second movement portion 32, and the illumination unit 24.

The head unit 33 prints an image on the medium 12 supported by the support portion 22. The head unit 33 may include a head 38 and a carriage 39. The carriage 39 supports the head 38.

The head 38 may include a plurality of nozzles 40 and a nozzle surface 41. Each of the plurality of nozzles 40 can eject a liquid. The nozzle surface 41 is a surface on which the plurality of nozzles 40 are open. The head 38 ejects the liquid from the plurality of nozzles 40 to perform printing on the medium 12.

The first movement portion 31 may include a carriage motor 43, a driving pulley 44, a driven pulley 45, and a timing belt 46.

The driving pulley 44 is coupled to an output shaft of the carriage motor 43. The driving pulley 44 and the carriage motor 43 may be indirectly coupled via a speed reducer or the like.

The driven pulley 45 is rotatably supported by the guide frame 34. The driving pulley 44 and the driven pulley 45 have parallel axis lines.

The timing belt 46 is an annular belt. The timing belt 46 is stretched over the driving pulley 44 and the driven pulley 45. A portion of the timing belt 46 is fixed to the head unit 33.

The first movement portion 31 transmits a driving force of the carriage motor 43 to the head unit 33 through the timing belt 46. The first movement portion 31 reciprocates the head unit 33 along the X axis. That is, the first movement portion 31 moves the head unit 33 in the first direction X. The head unit 33 is a serial type that performs printing while moving in the first direction X and a direction opposite to the first direction X.

The second movement portion 32 may include a pair of rails 48 and a pair of legs 49.

The pair of rails 48 are provided with a space therebetween to sandwich the support portion 22 in the first direction X. In other words, the support portion 22 is located between the pair of rails 48 in the first direction X. Each of the pair of rails 48 extends in the second direction Y.

The pair of legs 49 support the accommodation frame 35. The pair of legs 49 can reciprocate along the pair of rails 48 by being driven by a moving motor (not illustrated). The second movement portion 32 reciprocates the first movement portion 31, the head unit 33, the guide frame 34, and the accommodation frame 35 along the Y-axis. That is, the second movement portion 32 moves the first movement portion 31 in the second direction Y.

The guide frame 34 supports the head unit 33 and the first movement portion 31. The guide frame 34 may be supported by the accommodation frame 35.

The printing device 11 may include a signal cable 51 and a supply tube 52.

The accommodation frame 35 may accommodate at least one of the carriage motor 43, the signal cable 51 and the supply tube 52. The accommodation frame 35 may accommodate the supply tube 52 and the signal cable 51 while allowing deformation thereof.

The signal cable 51 sends electrical signals to the head unit 33. The signal cable 51 couples the control unit 20 and the head unit 33. The signal cable 51 is, for example, a wide flexible flat cable.

The supply tube 52 supplies a liquid to the head unit 33. The supply tube 52 couples a liquid container (not illustrated) that contains the liquid and the head unit 33. The signal cable 51 and the supply tube 52 are deformed inside the accommodation frame 35 as the head unit 33 is moved by the first movement portion 31.

The top plate 36 may be supported by the accommodation frame 35. The top plate 36 may be provided on the accommodation frame 35. The top plate 36 may cover the accommodation frame 35 from above. The top plate 36 may hide the carriage motor 43, the supply tube 52, and the signal cable 51 accommodated in the accommodation frame 35 when viewed from the third direction Z. The top plate 36 may be pressed from above so that the signal cable 51 to be deformed and the supply tube 52 do not protrude from the accommodation frame 35.

The top plate 36 may move in the second direction Y together with the first movement portion 31. The second movement portion 32 may move the guide frame 34, the first movement portion 31, the head unit 33, and the top plate 36 together with the accommodation frame 35 in the second direction Y and a direction opposite to the second direction Y. The second movement portion 32 moves members attached directly or jointly to the accommodation frame 35 in the second direction Y by moving the accommodation frame 35.

Figure 3:
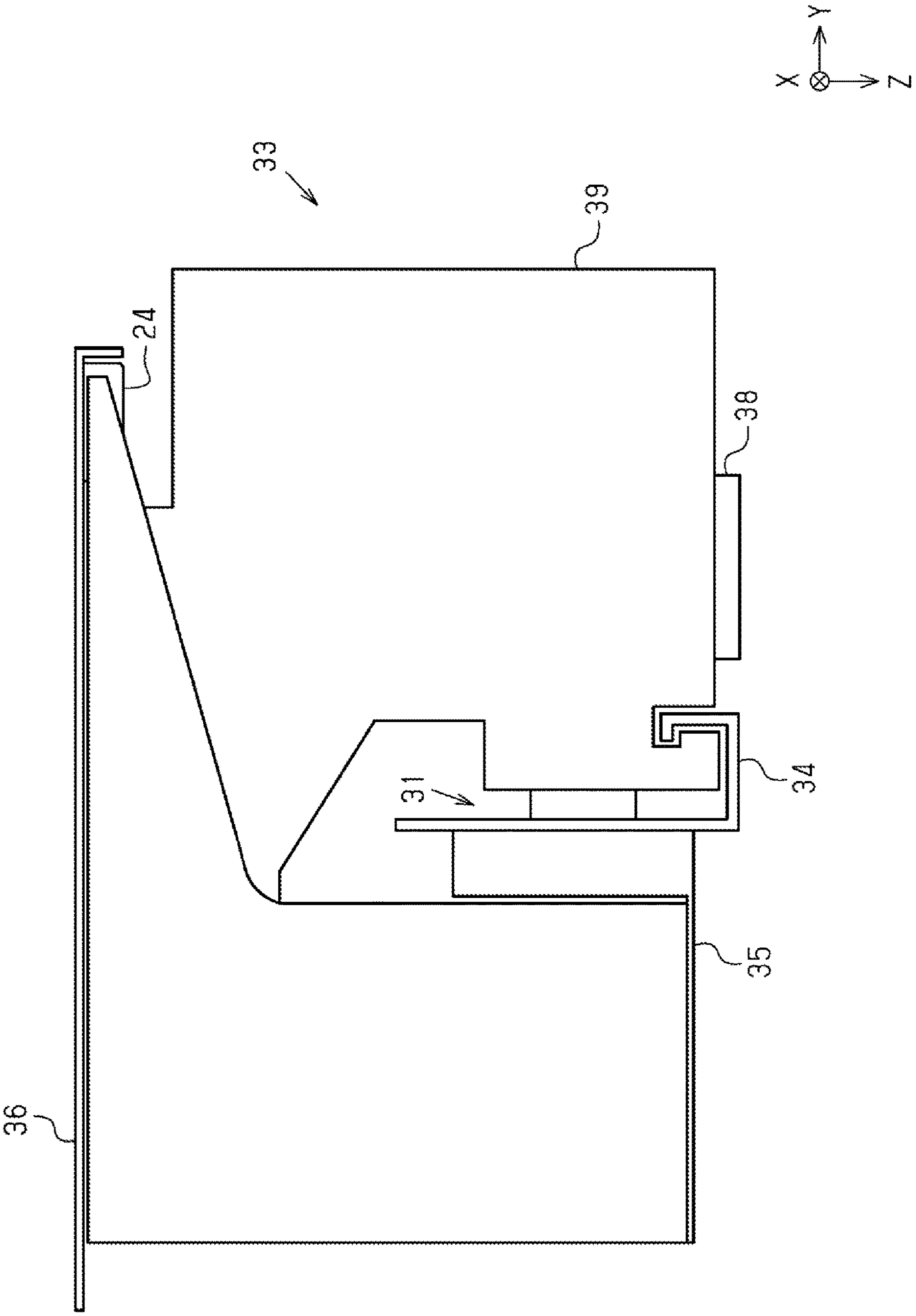
FIG. 3 is a schematic side view of a head unit.

As illustrated in FIG. 3, an end portion of the top plate 36 in the second direction Y may be located in the second direction Y relative to the first movement portion 31. That is, a front end of the top plate 36 may be located in the forward direction relative to the first movement portion 31. A rear end of the top plate 36 may be located in the backward direction relative to the first movement portion 31. The first movement portion 31 may be located under the top plate 36. The top plate 36 may cover the first movement portion 31 when viewed from the third direction Z. The top plate 36 may be larger than the first movement portion 31 in the first direction X. The top plate 36 may be larger than the first movement portion 31 in the second direction Y.

An end portion of the head unit 33 in the second direction Y may be located in the second direction Y relative to the end portion of the top plate 36 in the second direction Y. That is, a front end of the head unit 33 may be located in the forward direction relative to the front end of the top plate 36.

The illumination unit 24 emits light. The illumination unit 24 of the present embodiment is disposed on the top plate 36. The illumination unit 24 may be provided at the front end of the top plate 36. The illumination unit 24 may be provided on a bottom surface of the top plate 36 and emit light downward.

As illustrated in FIG. 2, the illumination unit 24 is disposed to be able to face the support surface 29. The illumination unit 24 moves in the second direction Y. The illumination unit 24 of the present embodiment moves in the second direction Y as the second movement portion 32 moves the first movement portion 31.

The illumination unit 24 is located between the top plate 36 and the support surface 29 in the third direction Z. The illumination unit 24 is disposed at a position aligned with a movement path of the head unit 33 moving in the first direction X, in the third direction Z. The head unit 33 moving in the first direction X passes under the illumination unit 24. The head unit 33 moving in the first direction X passes between the illumination unit 24 and the support surface 29. A surface of the head unit 33 facing the top plate 36, that is, a top surface of the carriage 39 may have a step at a location facing the illumination unit 24. A step corresponding to a Z-axis thickness of the illumination unit 24 may be provided in the second direction Y in the top surface of the carriage 39, so that a location facing the top plate 36 in which the illumination unit 24 is not provided and a location facing the illumination unit 24 are substantially the same distance apart.

The illumination unit 24 may extend in the first direction X. In the first direction X, the illumination unit 24 may be larger than the support surface 29. A right end of the illumination unit 24 may be located in the right direction relative to the right end of the support surface 29. A left end of the illumination unit 24 may be located in the left direction relative to the left end of the support surface 29. The illumination unit 24 may illuminate the support surface 29 over the first direction X. The illumination unit 24 may be provided at a position away from the head unit 33 located at a home position Ph in the first direction X.

The maintenance portion 25 performs maintenance of the head 38. The maintenance portion 25 may include a cap 54. The cap 54 is provided directly under the head 38 located at the home position Ph. The cap 54 can reciprocate along the Z-axis. The cap 54 rises and contacts the head 38 to cap the head 38. The maintenance portion 25 may perform suction cleaning in which the liquid is discharged from the nozzles 40 by suctioning the inside of the cap 54 to create a negative pressure. The maintenance portion 25 may wipe the nozzle surface 41 with a wiper (not illustrated).

Operation of Embodiment

An operation of the present embodiment will be described.

The guide frame 34 reciprocates along the rails 48. The printing unit 23 may execute printing in a process of moving the head unit 33 located at the home position Ph to a printing start position in the forward direction and then moving in the backward direction. The head unit 33 ejects a liquid while moving in the first direction X and in a direction opposite to the first direction X along the guide frame 34 to perform printing on the medium 12.

The control unit 20 may control lighting and extinguishing of the illumination unit 24. A timing when the illumination unit 24 is lit and extinguished may be set by operating the operating unit 16. The timings when the illumination unit 24 is lit and extinguished may be combined arbitrarily.

The illumination unit 24 may be lit at a timing when the printing device 11 is powered on. It is possible to cause the user to ascertain the internal state from the outside of the housing 14 formed by a transparent member, by lighting the illumination unit 24 at the timing when the printing device 11 is powered on. Specifically, it is possible to cause the user to ascertain the head unit 33 stopped at the home position Ph, the presence or absence of the medium 12 set on the support portion 22, and the like.

The illumination unit 24 may be lit at a timing when the cover 15 moves from the closing position. The illumination unit 24 is lit at a timing when the cover 15 is open, making it possible to assist the user in setting the medium 12 onto the support portion 22 and collecting the medium 12.

The illumination unit 24 may be lit at a timing when printing is started. The illumination unit 24 may be lit at a timing when the printing start is instructed, or may be lit at a timing when the head unit 33 moves to the printing start position. The illumination unit 24 is lit at the time of printing, making it possible to cause a position of the head unit 33, a printed image, and the like to be confirmed from outside the housing 14.

The illumination unit 24 may be lit at a timing when maintenance of the head 38 is started. The illumination unit 24 may be lit at a timing when an error is detected or is reported. The illumination unit 24 may be lit at a timing when a lighting operation is performed by the operating unit 16.

The illumination unit 24 may be extinguished at a timing when the printing device 11 is powered off. The illumination unit 24 may be extinguished at a timing when the cover 15 moves to the closing position. The illumination unit 24 may be extinguished at a timing when the printing ends. The illumination unit 24 may be extinguished at a timing when the maintenance of the head 38 ends. The illumination unit 24 may be extinguished at a timing when an error is resolved. The illumination unit 24 may be extinguished at a timing when an extinguishing operation was performed by the operating unit 16. The illumination unit 24 may be extinguished when a certain period of time was elapsed without being operated.

Effects of Embodiment

Effects of the present embodiment will be described.

(1-1) The illumination unit 24 is provided movably. Therefore, the illumination unit 24 can widely illuminate an area in which printing is performed, as compared with a case in which the illumination unit 24 is fixed. Therefore, it is possible to confirm a printing state in a wide range.

(1-2) The illumination unit 24 moves as the first movement portion 31 moves. This makes it possible to more easily control the movement of the illumination unit 24 as compared with a case in which the illumination unit 24 is moved independently.

(1-3) The top plate 36 moves together with the first movement portion 31. This makes it possible to easily move the illumination unit 24 together with the first movement portion 31 by disposing the illumination unit 24 on the top plate 36.

(1-4) The illumination unit 24 extends in the first direction X. Therefore, the illumination unit 24 can illuminate a wide area in the first direction X.

(1-5) The illumination unit 24 is aligned in the third direction Z with the movement path of the head unit 33. Therefore, it is possible to easily confirm the moving head unit 33 and the image printed by the head unit 33.

(1-6) The head unit 33 is exposed in the second direction Y from the top plate 36. Therefore, it is possible to easily confirm the moving head unit 33.

(1-7) At least the top surface 14*t* of the housing 14 is formed by a transparent member. Therefore, it is possible to easily confirm a state inside the housing 14 illuminated by the illumination unit 24 from the outside of the housing 14.

Modification Example

The present embodiment can be implemented with the following modification examples. The present embodiment and the following modification examples can be implemented in combination with each other within a technically consistent range.

The top surface of the carriage 39 that can face the illumination unit 24 may be configured according to the intensity of the light from the illumination unit 24. When the top surface of the carriage 39 is illuminated by the illumination unit 24, the top surface may be adjusted so that an amount of light can be easily confirmed from the outside of the housing 14. For example, when the light from the illumination unit 24 is strong or when the housing 14 easily transmits the light, the top surface of the carriage 39 may be made difficult to reflect the light. Specifically, the top surface of the carriage 39 may be dark colored such as black or blue to absorb light, or may be roughened to diffuse light. For example, when the light from the illumination unit 24 is weak or when the housing 14 is difficult to transmit light, the top surface of the carriage 39 may be made to reflect light easily. Specifically, the top surface of the carriage 39 may have a light color such as white or yellow or be a glossy surface, to reflect light.

The illumination unit 24 may emit light in a direction inclined with respect to the third direction Z.

A direction in which the illumination unit 24 emits the light may be changeable. For example, the illumination unit 24 may change an angle at which the light is emitted according to a position in the second direction Y. The illumination unit 24 may emit the light toward the support portion 22. For example, when the illumination unit 24 is located in the backward direction relative to the support portion 22, the illumination unit 24 may emit the light at an angle inclined in the forward direction relative to the third direction Z. For example, when the illumination unit 24 is located in the forward direction relative to the support portion 22, the illumination unit 24 may emit light at an angle inclined in the backward direction relative to the third direction Z.

The housing 14 may be formed by an opaque member.

The housing 14 may have a window that allows the user to ascertain an internal state.

The top plate 36 may be formed by a transparent member.

The front end of the top plate 36 may be located in the forward direction relative to the front end of the head unit 33. The top plate 36 may cover the movement path of the head unit 33 when viewed from the third direction Z.

The illumination unit 24 may be disposed at a position shifted in the second direction Y from the movement path of the head unit 33 moving in the first direction X.

The illumination unit 24 may have a plurality of illuminations provided side by side in the first direction X.

The third direction Z may be a direction inclined with respect to the support surface 29. The third direction Z may be a direction that obliquely crosses the support surface 29.

The illumination unit 24 may be disposed separately from the top plate 36. The illumination unit 24 may be disposed on the guide frame 34, for example. The illumination unit 24 may be disposed in, for example, the accommodation frame 35.

The printing device 11 may include a movement mechanism that moves the illumination unit 24 separately from the printing unit 23. The illumination unit 24 may be movable separately from the second movement portion 32 moving the first movement portion 31.

The medium 12 may be clothing such as T-shirts, polo shirts, trainers, or hoodies. The medium 12 may not be a flexible one, such as a smart phone case printed using UV inks.

The printing device 11 is a device that prints an image such as a character, a picture, and a photograph by attaching a liquid such as ink or fluid such as toner to the medium 12, and may be a serial printer, a lateral printer, a line printer, a page printer, or the like. Further, the printing device 11 may be an offset printing device, a textile printing device, or the like. The printing device may have at least a printing function of performing printing on a medium, and may be a multi-function device having functions other than the printing function.

Definition

A representation "at least one" as used herein means "one or more" of desired options. As an example, a representation "at least one" as used herein means "only one option" or "both of two options" when the number of options is two. As another example, the representation "at least one" as used herein means "only one option" or "any combination of two or more options" when the number of options is three or more.

Supplements

Hereinafter, technical ideas and effects ascertained from the above-described embodiments and modification examples will be described.

(A) A printing device includes: a support portion having a support portion having a support surface supporting a medium; a head unit configured to print an image on the medium supported by the support portion; a first movement portion configured to move the head unit in a first direction; a second movement portion configured to move the first movement portion in a second direction intersecting with the first direction; and an illumination unit disposed to be able to face the support surface and configured to emit light, wherein the illumination unit moves in the second direction.

According to this configuration, the illumination unit is movably provided. Therefore, the illumination unit can widely illuminate the area in which printing is performed, as compared with a case in which the illumination unit is fixed. Therefore, it is possible to confirm a printing state in a wide range.

(B) In the printing device, the illumination unit may move in the second direction as the second movement portion moves the first movement portion.

According to this configuration, the illumination unit moves as the first movement portion moves. Therefore, the movement of the illumination unit can be controlled more easily as compared with a case in which the illumination unit is moved independently.

(C) The printing device may further include a top plate configured to cover the first movement portion when viewed from a third direction intersecting with the support surface, wherein the top plate may move in the second direction together with the first movement portion, and the illumination unit may be disposed on the top plate.

According to this configuration, the top plate moves together with the first movement portion. Therefore, it is possible to easily move the illumination unit together with the first movement portion by disposing the illumination unit on the top plate.

(D) In the printing device, the illumination unit may extend in the first direction.

According to this configuration, the illumination unit extends in the first direction. Therefore, the illumination unit can illuminate a wide area in the first direction.

(E) In the printing device, in the third direction intersecting with the support surface, the illumination unit may be disposed at a position aligned with a movement path of the head unit moving in the first direction.

According to this configuration, the illumination unit is aligned with the movement path of the head unit in the third direction. Therefore, it is possible to easily confirm the moving head unit and the image printed by the head unit.

(F) In the printing device, an end portion of the head unit in the second direction may be located in the second direction relative to an end portion of the top plate in the second direction.

According to this configuration, the head unit is exposed in the second direction from the top plate. Therefore, it is possible to easily confirm the moving head unit.

(G) The printing device may further include a housing configured to accommodate the support portion, the head unit, the first movement portion, the second movement portion, and the illumination unit, wherein at least a top surface of the housing may be formed by a transparent member.

According to this configuration, at least the top surface of the housing is formed by a transparent member. Therefore, it is possible to easily confirm an internal state of the housing illuminated by the illumination unit from the outside of the housing.

What is claimed is:

1. A printing device comprising:

a support portion having a support surface supporting a medium;

a head unit configured to print an image on the medium supported by the support portion;

a first movement portion configured to move the head unit in a first direction;

a second movement portion configured to move the first movement portion in a second direction intersecting with the first direction;

an illumination unit disposed to face the support surface and configured to emit light; and a top plate configured to cover the first movement portion when viewed from a third direction intersecting with the support surface, wherein the illumination unit moves in the second direction as the second movement portion moves the first movement portion, the top plate moves in the second direction together with the first movement portion, and the illumination unit is disposed on the top plate.

2. The printing device according to claim 1, wherein the illumination unit extends in the first direction.

3. The printing device according to claim 1, wherein, in the third direction intersecting with the support surface, the illumination unit is disposed at a position aligned with a movement path of the head unit moving in the first direction.

4. The printing device according to claim 1, wherein an end portion of the head unit in the second direction is located in the second direction relative to an end portion of the top plate in the second direction.

5. The printing device according to claim 1, further comprising:

a housing configured to accommodate the support portion, the head unit, the first movement portion, the second movement portion, and the illumination unit, wherein at least a top surface of the housing is formed by a transparent member.

* * * * *